W. PITT.
Machine for Cutting Meat for Packing.
No. 162,495. Patented April 27, 1875.
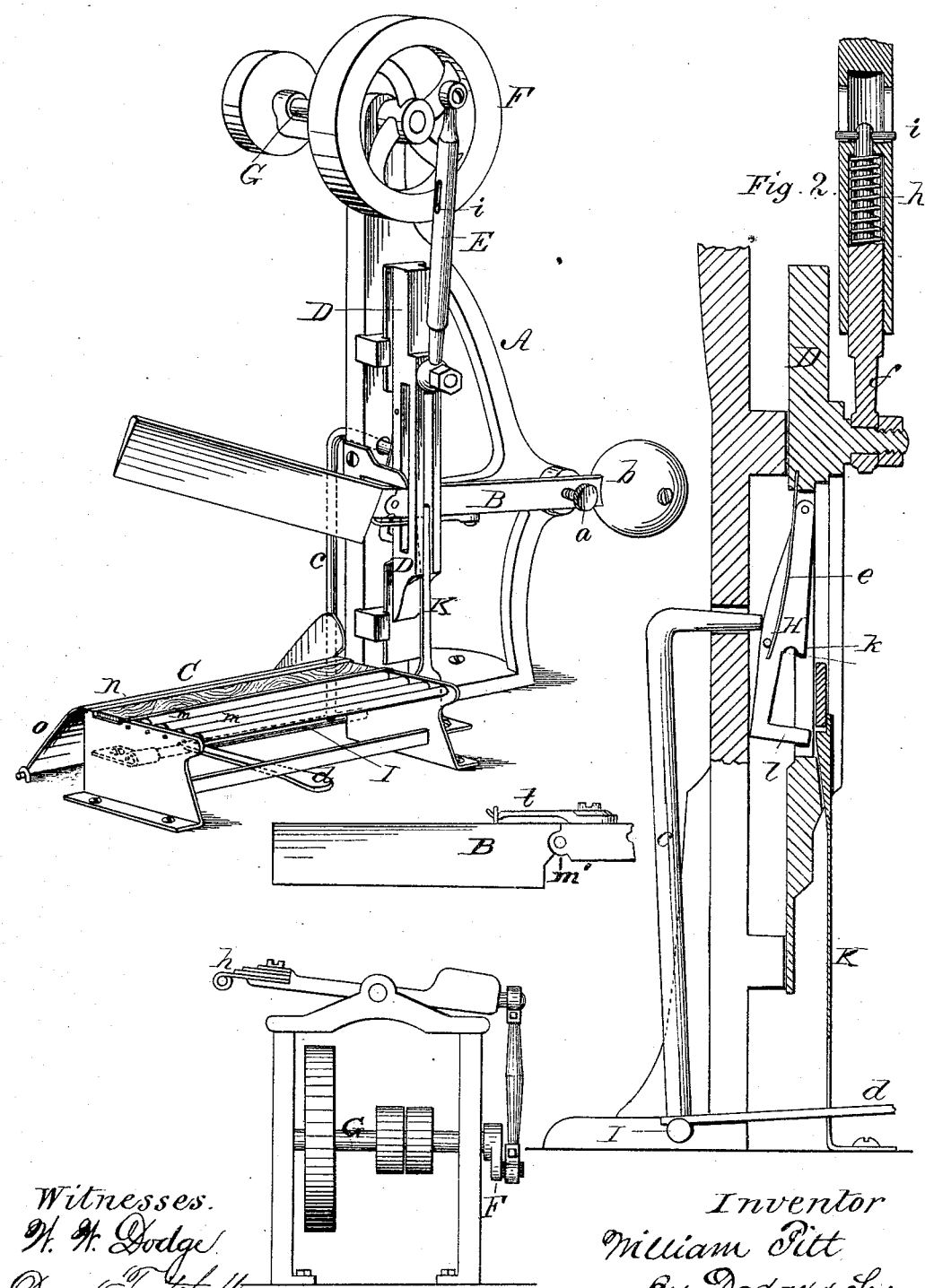
Witnesses.
W. H. Dodge
Donn Twitchell
Inventor
William Pitt
By Dodge & Son
Attys.

UNITED STATES PATENT OFFICE.

WILLIAM PITT, OF BALTIMORE, MD., ASSIGNOR OF ONE-HALF HIS RIGHT TO CHARLES A. VOGELER AND ADOLPH C. MEYER, OF SAME PLACE.

IMPROVEMENT IN MACHINES FOR CUTTING MEAT FOR PACKING.

Specification forming part of Letters Patent No. 162,495, dated April 27, 1875; application filed March 22, 1875.

*To all whom it may concern:*

Be it known that I, WILLIAM PITT, of Baltimore, State of Maryland, have invented certain Improvements in Machines for Cutting Meat, of which the following is a specification:

My invention relates to a power-machine for cutting beef and pork into proper shape for packing; and consists, mainly, in the combination of a chopping-knife or cleaver with an operating mechanism, in such manner that while said mechanism operates continuously the knife is only brought into action at the will of the operator.

Figure 1 represents a perspective view of my machine; Fig. 2, a vertical section of the same through the knife and its actuating mechanism; Fig. 3, a view, showing the manner of jointing the knife; Fig. 4, a side elevation of a modified form of the machine.

A represents a strong upright frame, to the side of which there is pivoted the arm of a large cutting or cleaving blade, B, which is arranged to strike down upon a fixed bed or table, C, located by the side of the frame, as shown, the knife-arm being provided, in rear of its pivot $a$, with a counter-weight, $b$, which serves to raise the knife and hold it in an elevated position, except when the operating devices are brought into play thereon. The knife-arm or beam passes through a slot in a vertical slide, D, which is mounted in guides on the frame, and operated by means of a pitman, E, which has its upper end connected to a crank-wheel, F, which latter is mounted on the end of a horizontal shaft, G, supported in bearings on the top of the frame. The slide D is also provided with a vertical slot through it at right angles to the knife-arm, and in this slot, in the inner or back side of the slide, there is pivoted a dog, H, having at its middle a shoulder, $k$, and at its lower end an arm, $l$, as shown in Fig. 2. To the slide there is also attached a spring, $e$, which serves to press the dog backward, and prevent it from coming in contact with the knife-arm as the slide moves up and down. Below the bed or table C there is mounted a horizontal rock-shaft, I, provided with a treadle or foot-lever, $d$, and with an upright arm, $c$, which has its upper end arranged to bear upon the dog H when the slide D is at the upper end of its stroke, as shown in Figs. 1 and 2. In front of the frame there is secured an upright spring-arm, K, the upper end of which enters the slot in the slide D, and bears under the knife-arm C when the latter is in an elevated position, as shown, so as to prevent the knife from being depressed accidentally.

When the slide and dog are raised to the highest point the spring-arm K bears upon the lower end of the dog, as represented in Fig. 2, and tends to throw or hold the dog backward, so that it will not engage with the knife-arm.

The pitman E, instead of being made solid, is composed of two parts, $f$ and $g$, the latter sliding within the former, and being surrounded by a spiral spring, $h$, arranged as shown in Fig. 2, so that in the event of the slide meeting with great resistance in its downward stroke the pitman will yield and shorten, and thereby relieve the mechanism from the shock and strain which would otherwise occur.

The bed C, on which the meat to be cut is supported, consists of a strong rigid frame containing a wooden strip, $n$, for the edge of the knife to strike upon, and a series of horizontal rollers, $m$, which, turning freely in their bearings, enable the operator to move and handle the meat with ease and facility.

In the drawings I have shown the table with rollers in front only of the knife; but, when desired, a corresponding series of rollers may be arranged behind the knife.

When the rear rollers are not employed, I arrange an inclined plate or board, $o$, at the rear side of the table, to slide the pieces of meat down upon as they leave the knife.

If desired, gearing may be connected with the rolls in such manner as to give them a constant rotary motion in the proper direction to assist in moving the meat backward on the table.

The wooden block $n$, which is arranged to present its grain endwise to the knife, is seated in a recess in the table or frame, and held by a gib and set-screws, so that it can be readily reversed or removed in order to be replaced by another. In place of the set-screws and gib any other suitable fastening devices may be employed.

The operation of the machine is as follows: The wheel F, being set in motion, imparts through the pitman E, a continuous reciprocating motion to the vertical slide D, which plays freely over the knife-arm, which latter is held stationary in its raised or elevated position by the counter-weight and the spring-arm K. When the knife is to be brought down the operator depresses the treadle $d$, which operating the rock-shaft I, causes the arm $c$ to press inward against the dog H, which engages over the knife-arm, and at the same time throws back the spring K from under the arm, so that as the slide D descends, the dog drives the knife down upon the table, and that as the slide rises the arm $l$ of the dog raises the knife. While the pressure of the operator's foot on the treadle is continued the dog retains its hold on the arm, and the knife is carried up and down with a positive motion; but when the treadle is relieved from pressure, the dog is thrown back and the knife remains in its elevated position while the operation of the slide continues. When cutting thick heavy meat it is necessary to drive the knife clear down through the same with a positive motion, but when operating on mess-pork and other thin meats, it is desirable to start the knife and then have it cut through the meat by its momentum only, as the action is better and the strain on the machine less. This action is produced by the use of the spring $e$, which tends constantly to throw the dog back clear of the knife-arm. When operating on thick meats the knife encounters a resistance early in the course of its descent, and is forced up against the shoulder of the dog with such firmness that the dog retains its hold until the end of the stroke, but when operating on thin meats the knife does not meet with resistance until near the end of its stroke, and previous to the commencement of the resistance the dog will have passed below the end of arm $c$, and have been thrown back by the spring $e$, so that the remainder of the stroke of the knife will be due solely to the momentum acquired by it previous to the release of the dog. In order to render the hold of the dog on the knife-arm firm and secure, its shoulder $k$ is hollowed out or made concave, as shown. For the purpose of relieving the parts from strain and rendering their action smooth and easy when the knife sticks fast in the wooden bed-piece, as it will sometimes do, the blade is connected to its arm by a knuckle-joint, $m'$, so that its outer end can be depressed, and is provided with a spring, $t$, which holds it up in position, as shown in Figs. 1 and 3, so that when the blade sticks fast the joints yields and permits the blade to commence drawing or lifting out at the inner end first, and thence toward the opposite end. By thus lifting the blade at one end first, it is drawn from the wood easily and with a comparatively small expenditure of power.

The blade will be arranged in such manner as to be readily detachable in order to admit of its being sharpened or replaced by another; and the counter-weight will be made adjustable on the arm so that it may be caused to balance knives of different weights and to throw them up with more or less quickness when free from the dog.

Instead of arranging the crank-shaft at the top of the machine, as shown in Fig. 1, the construction shown in Fig. 4 may be adopted to render the machine more compact. In the modified form of machine the crank-shaft is mounted in the lower part of the frame and provided with the crank on the rear side of the frame. The crank is connected by the pitman with a vibrating bar or walking-beam, M, which is pivoted at its middle to the top of the frame, and provided at its forward end with a pitman or other connection to the slide, which, together with the other parts, will be constructed and arranged in the same manner as in Figs. 1 and 2. One end of the vibrating bar or beam will be provided with a flat spring, $h$, having one free end, to which the connection will be made in order to allow the parts to yield when the knife meets a heavy bone or other obstruction, the arrangement answering the same purpose as the yielding pitman in Fig. 2. The spring is supported firmly on the under side, so that in raising the knife it does not yield.

It is obvious that the construction and arrangement of the details may be varied in many respects without materially changing the machine or its operation.

The essential feature of the machine is the arrangement of the blade so that it comes into play only at the will of the operator, while the actuating mechanism operates continuously; and it is obvious that the mechanism for accomplishing this result may be arranged in various ways. It is also obvious that instead of the pivoted knife a sliding one may be arranged to operate in the same manner, and that in place of the counter-weight a spring or other device may be used to sustain the knife. In place of the long spring-arm K, a pivoted or hinged dog operated by a spring may be employed. There is, however, no absolute necessity for the spring K, or its equivalent, as the machine will operate well without it.

Having thus described my invention, what I claim is—

1. In combination with the pivoted counterbalanced knife B, the vertical slide D provided with the dog H, which may be caused to engage with and operate the knife.

2. In combination with the pivoted knife B, the slide D provided with the dog H and spring $e$, and the rock-shaft I, provided with the arm $c$ and treadle $d$, as shown and described.

3. In combination with the knife B slide D and dog H, the spring-arm K or its equivalent.

4. In combination with the bed or table C, and the slide D, arranged to lift the knife at its inner end, the knife B provided with the knuckle-joint and spring, as and for the purpose described.

5. The combination of a vertically-moving knife, and a bed or table provided with rollers $m$, and a removable wooden block to receive the blow of the knife, substantially as described.

6. The combination, substantially as shown and described, of a movable knife, and an actuating mechanism, which starts the knife with a positive motion, and then releases the same and permits it to finish its stroke by its momentum, as set forth.

7. The combination of a vertically-moving knife with an operating mechanism, arranged so that while the mechanism has a continuous movement, the knife will be operated only when it is caused to engage therewith by the attendant, substantially as and for the purpose set forth.

WILLIAM PITT.

Witnesses:
P. T. DODGE,
A. C. MEYER.